United States Patent
Lukic et al.

(10) Patent No.: US 10,823,566 B2
(45) Date of Patent: Nov. 3, 2020

(54) METHOD FOR COMPARING A RECEIVED BEAM HITTING A LASER RECEIVER WITH A ROTATING LASER BEAM

(71) Applicant: Hilti Aktiengesellschaft, Schaan (LI)

(72) Inventors: Sasha Lukic, Buchs (CH); Andras Halasi, Feldkirch (AT); Ian Kearney, Feldkirch (AT); Ermin Calkic, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 177 days.

(21) Appl. No.: 16/313,294

(22) PCT Filed: Jun. 21, 2017

(86) PCT No.: PCT/EP2017/065157
§ 371 (c)(1),
(2) Date: Dec. 26, 2018

(87) PCT Pub. No.: WO2018/001803
PCT Pub. Date: Jan. 4, 2018

(65) Prior Publication Data
US 2019/0154445 A1    May 23, 2019

(30) Foreign Application Priority Data
Jun. 30, 2016  (EP) .................................... 16177222

(51) Int. Cl.
*G01C 15/00*     (2006.01)
*G01J 1/02*      (2006.01)

(52) U.S. Cl.
CPC ......... *G01C 15/006* (2013.01); *G01C 15/004* (2013.01); *G01J 1/0219* (2013.01)

(58) Field of Classification Search
CPC .. G01C 15/006; G01C 15/004; G01C 15/008; G01C 25/00; G01C 9/00; G01C 9/26;
(Continued)

(56) References Cited

U.S. PATENT DOCUMENTS 7,119,316 B2  10/2006  Green et al.
7,224,473 B2   5/2007  Zalusky
(Continued)

FOREIGN PATENT DOCUMENTS

JP      8-247761 A   9/1996
JP   2005-274228 A  10/2005
(Continued)

OTHER PUBLICATIONS

PCT/EP2017/065157, International Search Report (PCT/ISA/210 and PCT/ISA/220) dated Oct. 30, 2017, with partial English translation, enclosing Written Opinion of the International Searching Authority (PCT/ISA/237) (Fifteen (15) pages).
(Continued)

*Primary Examiner* — Yaritza Guadalupe-McCall
(74) *Attorney, Agent, or Firm* — Crowell & Moring LLP

(57) ABSTRACT

A method includes comparing a received beam hitting a laser receiver in a transverse arrangement with a rotating laser beam which is moved about an axis of rotation in a vertical position by a rotary laser. The laser receiver includes an evaluating unit and a detection field having a longitudinal direction and a transverse direction. The rotary laser is arranged on a rotational platform that can be adjusted about a rotation axis, and the vertical laser plane that the rotating laser beam produces is moved by the rotational platform in a direction of rotation about the rotation axis. In the longitudinal direction of the detection field, an adjustment direction of the received beam relative to the laser receiver is determined by the evaluating unit and the adjustment direction of the received beam is compared with the direction of rotation of the rotational platform by the evaluating unit.

15 Claims, 4 Drawing Sheets

(58) Field of Classification Search
CPC .... G01C 15/04; G01C 2009/066; G01C 9/06; G01C 15/02; G01C 15/12; G01C 3/20; G01J 1/0219
USPC .......................................................... 33/290
See application file for complete search history.

(56) References Cited

U.S. PATENT DOCUMENTS

| | | | |
|---|---|---|---|
| 7,836,808 B2 | 11/2010 | Ake | |
| 7,970,519 B2 | 6/2011 | Green | |
| 8,869,411 B2* | 10/2014 | Lukic | G01C 15/004 33/228 |
| 10,684,129 B2* | 6/2020 | Lukic | G01C 25/00 |
| 2010/0296075 A1* | 11/2010 | Hinderling | G01C 15/004 356/3 |
| 2019/0154443 A1* | 5/2019 | Winter | G01C 15/004 |
| 2019/0154444 A1* | 5/2019 | Lukic | G01C 15/006 |
| 2019/0154445 A1* | 5/2019 | Lukic | G01C 15/004 |

FOREIGN PATENT DOCUMENTS

| | | |
|---|---|---|
| JP | 2010-505052 A | 2/2010 |
| JP | 2012-112953 A | 6/2012 |

OTHER PUBLICATIONS

U.S. Patent Application, "Method for Comparing a Received Beam Incident on a Laser Receiver with a Rotating Laser Beam", filed Dec. 26, 2018, Inventor: Sasha Lukic et al.
U.S. Patent Application, "Procedure for Comparing a Reception Beam Impinging on a Laser Receiver with a Rotating Laser Beam", filed Dec. 26, 2016, Inventor: Sasha Lukic et al.

* cited by examiner

METHOD FOR COMPARING A RECEIVED BEAM HITTING A LASER RECEIVER WITH A ROTATING LASER BEAM

CROSS REFERENCE TO RELATED APPLICATIONS

This application claims the priority of International Application No. PCT/EP2017/065157, filed Jun. 21, 2017, and European Patent Document No. 16177222.3, filed Jun. 30, 2016, the disclosures of which are expressly incorporated by reference herein.

BACKGROUND AND SUMMARY OF THE INVENTION

The present invention relates to a method for comparing a received beam hitting a laser receiver with a rotating laser beam as well as a device to carry out such a method.

Rotary lasers are used inside and outside for leveling and marking work such as the display of horizontal, vertical, or diagonal laser markings on a target surface or the determination and verification of horizontal height gradients, vertical lines, lines of sight, and perpendicular points. Rotary lasers can be arranged in various device positions which are formed as horizontal position and vertical position. Here horizontally usable rotary lasers that are used exclusively in the horizontal position, and horizontally and vertically usable rotary lasers that are used in the horizontal position and vertical position are differentiated.

In rotary lasers that may be used without protective measures such as goggles, the maximum laser power is limited. The allowed maximum laser powers with regard to leveling and marking work outdoors frequently results in non-visible or poorly visible laser beams. To improve the visibility of the laser beams, target plates or laser receivers are held into the laser beam. Laser receivers are held as a handheld device by a user directly into the laser beam or attached to a telescopic or leveling rod. Laser receivers can be equipped with a height measurement function which detects the arrival position of a received beam on a detection field of the laser receiver and represents the distance of the received beam to a zero position of the detection field as a height position. Known laser receivers with height measurement function comprise an evaluating unit and at least one detection field with a longitudinal direction and a transverse direction wherein the laser receiver is oriented in a longitudinal arrangement or a transverse arrangement as a function of the device position of the rotary laser. With a rotary laser in horizontal position, the longitudinal direction of the detection field is oriented parallel to the direction of gravity (transverse arrangement).

For leveling and marking work, there may be incorrect measurements due to external radiation or reflections from the rotating laser beam. Various methods are known for comparing a received beam hitting the laser receiver with the rotating laser beam. In order to reduce the risk of incorrect measurements with a laser receiver, it is known to modulate the rotating laser beam of the rotary laser with a modulation signal. The received beam hitting the laser receiver is evaluated by the evaluating unit of the laser receiver and categorized as a rotating laser beam when the received beam has been modulated with the modulation signal. The disadvantage is that a reflection of the rotating laser beam on a reflection surface is not detected by the evaluating unit. The reflected laser beam has been modulated with the modulation signal and is categorized by the evaluating unit of the laser receiver as a rotating laser beam.

U.S. Pat. No. 7,119,316 B2 discloses another known method for comparing a received beam hitting a laser receiver with a rotating laser beam which is emitted by a rotary laser. The laser receiver comprises a detection field which is composed of a plurality of photodetector arrays in a longitudinal direction, wherein the photodetector arrays in the longitudinal direction each comprise a plurality of photodetectors. Upon impact of a received beam on the detection field, the evaluating unit for each photodetector array determines first and second reference signals, wherein the first and second reference signal represent the amplitudes of the outer photodetectors of the photodetector array that are detected by the received beam. The reference signals are further processed by the evaluating unit by summation, difference and quotient formation, until a quotient is produced for the evaluation. This quotient is compared with a preset limit. If the quotient is less than the limit, the received beam is categorized as a laser beam ("moving thin beam of laser light"). If the quotient is greater than the limit, the received beam is categorized as an external beam ("omni-directional pulse of light").

From U.S. Pat. No. 7,224,473 B2, an additional method is known for comparing a received beam hitting a laser receiver with a rotating laser beam. The laser receiver comprises a detection field that is composed of a plurality of photodetectors in a longitudinal direction, and an additional photodetector. Upon impact of a received beam on the laser receiver, the evaluating unit determines a first, second, and third reference signal, wherein the first reference signal represents the electrical output of a first outer photodetector which is detected by the received beam, the second reference signal represents the electrical output of a second outer photodetector which is detected by the received beam, and the third reference signal represents the electrical output of the additional photodetector. Based on the third reference signal, there is an evaluation of the received beam. If the amplitude of the third reference signal is sufficiently low, the received beam is categorized as a laser beam of the rotary laser. If the amplitude of the third reference signal, however, is sufficiently high, the received beam is categorized as an external beam ("omni-directional pulse of light").

The methods known from U.S. Pat. No. 7,119,316 B2 and U.S. Pat. No. 7,224,473 B2 for a method to compare a received beam hitting a laser receiver with a rotating laser beam of a rotary laser have the disadvantage that a reflection of the rotating laser beam on a reflection surface is not detected by the evaluating unit of the laser receiver and is incorrectly categorized as a rotating laser beam. By the reflection of the rotating laser beam on the reflection surface, the amplitudes of the reference signals do not change or do so only slightly and have no effect on criteria for the evaluation of the received beam.

The object of the present invention is to develop a method for comparing a received beam hitting a laser receiver with a rotating laser beam in which the risk of incorrect measurements is reduced by reflection of the rotating laser beam on a reflection surface. In addition, the method should be suitable for a largely automated execution.

The method for comparing a received beam hitting a laser receiver with a rotating laser beam, which is moved by a rotary laser about an axis of rotation, wherein the laser receiver comprises an evaluating unit and at least one detection field with a longitudinal direction and a transverse direction, has the following steps according to the invention:

the rotary laser is arranged on a rotational platform that can be adjusted about an axis of rotation, wherein the axis of rotation of the rotary laser is oriented substantially perpendicular and the axis of rotation of the rotational platform is oriented substantially parallel to a gravitational direction of the gravitational field, and the laser receiver is oriented in a transverse arrangement, wherein in the transverse arrangement the longitudinal direction of the at least one detection field is oriented substantially perpendicular and the transverse direction of the at least one detection field is oriented substantially parallel to the direction of gravity the rotary laser is adjusted on the rotational platform in a rotational direction about the axis of rotation at least until the received beam hits the at least one detection field of the laser receiver in the longitudinal direction of the at least one detection field an adjustment direction of the received beam is determined by the evaluating unit relative to the laser receiver, and the adjustment direction of the received signal is compared by the evaluating unit with the rotational direction of the rotational platform.

The method according to the invention for comparing a received signal with a rotating laser beam is suitable for rotary lasers that are arranged in a vertical position on an adjustable rotational platform, and laser receivers that are oriented in a transverse arrangement. Here the vertical position of the rotary laser and the transverse arrangement of the laser receiver are defined via an orientation of the components to the gravitational direction of the gravitational field, wherein the gravitational direction is directed to the center of the earth's gravity. The following applies to the orientation of the components: the axis of rotation of the rotary laser and the longitudinal direction of the detection field are oriented perpendicularly to the gravitational direction, the axis of rotation of the rotational platform and the transverse direction of the detection field are oriented parallel to the gravitational direction wherein the rotating laser beam generates a vertical laser plane that is arranged parallel to the gravitational direction. A tilting of the laser receiver from the transverse arrangement is not critical to executing the method according to the invention. Even with a tilted laser receiver, the adjustment direction of the receiver beam relative to the laser receiver can be determined by the evaluating unit of the laser receiver and compared to the rotational direction of the rotational platform.

The evaluating unit evaluates the received beam based on the adjustment direction and distinguishes between a rotating laser beam, a reflected rotating laser beam, and a non-rotating external beam. With the help of the method according to the invention, a reflection of the rotating laser beam on a reflection surface can be detected; additionally, external beams that do not rotate about an axis of rotation can be distinguished from the rotating laser beam. For a non-rotating external beam, the evaluating unit cannot determine any adjustment direction of the received beam relative to the laser receiver. By comparison of the adjustment direction of the received beam and the rotational direction of the rotational platform, a reflection of the rotating laser beam on a reflection surface can be detected by the evaluating unit. The rotational platform moves the rotary laser in a known rotational direction about the axis of rotation. When the rotating laser beam hits the laser receiver after a reflection on a reflection surface as a received beam, the adjustment direction of the received beam is directed opposite to the known rotational direction of the rotational platform. The method according to the invention has the advantage that known rotary lasers, rotational platforms, and laser receivers are suitable for executing the method and no special components are required.

Preferably, a first impact position of the received beam on the at least one detection field is stored by the evaluating unit at a first time as a first height position and a second impact position is stored at a later second time as a second height position and the adjustment direction of the received beam is determined by the evaluating unit from the first and second height position. The rotary laser is adjusted by the rotational platform in a rotational direction about the axis of rotation until the detection field of the laser receiver detects a received beam. Subsequently, the rotation of the rotary laser about the axis of rotation is continued. During rotation of the rotary laser about the axis of rotation, the first and second impact position of the received beam on the detection field are determined by the evaluating unit. The laser receiver is equipped in the longitudinal direction with a measurement function that measures the position of the vertical laser plane relative to the zero position of the detection field. The first impact position has a distance to the zero position of the detection field that is referred to as the first height position H1, and the second impact position has a distance to the zero position of the detection field that is referred to as the second height position H2. The adjustment direction of the received beam runs parallel to the longitudinal direction of the detection field and the difference between the first and second height position ($\Delta$=H2−H1) determines the direction (positive or negative direction) of the adjustment direction of the received beam.

The further steps of the method according to the invention are dependent on whether the evaluating unit can determine an adjustment direction of the received beam relative to the laser receiver from the first and second height position. Depending on the adjustment direction of the received beam, non-rotating external beams and reflected laser beams can be distinguished from the rotating laser beam with the help of the method according to the invention.

The received beam is categorized by the evaluating unit of the laser receiver as an external beam when the first and second height position of the received beam substantially match. Any beam is designated an external beam that is different from the rotating laser beam of the rotary laser. For a non-rotating external beam, the first and second height position, which are generated by the received beam on the detection field, substantially match and the evaluating unit of the laser receiver cannot determine an adjustment direction of the received beam relative to the laser receiver from the first and second height position.

When the first and second height position of the received beam are different, the adjustment direction of the received beam is determined by the evaluating unit of the laser receiver. Here the adjustment direction of the received beam is defined as a positive direction when the difference between the first and second height position ($\Delta$=H2−H1) is greater than zero, and the adjustment direction of the received beam is defined as a negative direction when the difference between the first and second height position ($\Delta$=H2−H1) is smaller than zero.

The further steps of the method according to the invention are dependent on whether the adjustment direction of the received beam and the rotating direction of the rotational platform are in the same direction or opposite direction. The method according to the invention distinguishes between two variants: in a first variant, the adjustment direction of the received beam and the rotational direction of the rotational platform are in the same direction, and in a second variant the adjustment direction of the received beam and the rotational direction of the rotational platform are in the opposite direction.

When the adjustment direction of the received beam and the rotational direction of the rotational platform are in the same direction, the received beam is categorized by the evaluating unit of the laser receiver as a rotating laser beam. The rotary laser moves the rotating laser beam in a known rotational direction about the axis of rotation and the rotational platform moves the rotary laser in a known rotational direction about the axis of rotation. When the rotating laser beam hits the laser receiver without reflection on a reflection surface as a received beam, then the adjustment direction of the received beam is in the same direction to the known rotational direction of the rotational platform. With the method according to the invention, the received beam is categorized by the evaluating unit of the laser receiver always as a rotating laser beam when the adjustment direction of the received beam and the rotational direction of the rotational platform are in the same direction.

The adjustment direction of the received beam with an even number of reflections of the rotating laser beam is likewise in the same direction to the known rotational direction of the rotational platform so that received beams that are created by an even number of reflections of the rotating laser beam are categorized by the evaluating unit wrongly as a rotating laser beam. In the practical application of rotary lasers and laser receivers, the simple reflection of the rotating laser beam on a reflection surface represents the most common cause of incorrect measurements so that the method according to the invention reduces the risk of incorrect measurements but cannot completely prevent incorrect measurements.

Particularly preferably, the laser receiver is switched by the evaluating unit to a measurement mode wherein in measurement mode a height position of the received beam on the detection field of the laser receiver is determined. When an arriving received beam has been categorized by the evaluating unit of the laser receiver as a rotating laser beam, the laser receiver can be used as provided. For this purpose, the laser receiver can be switched by the evaluating unit to a measurement mode.

If the adjustment direction of the received beam and the rotational direction of the rotational platform are in the opposite direction, the received beam is categorized by the evaluating unit of the laser receiver as a reflected laser beam. The rotary laser moves the rotating laser beam in a known rotational direction about the axis of rotation and the rotational platform moves the rotary laser in a known rotational direction about the axis of rotation. If the rotating laser beam hits the laser receiver after a reflection on a reflection surface as a received beam, the adjustment direction of the received beam is in the opposite direction to the known rotational direction of the rotational platform. With the method according to the invention, the received beam is categorized by the evaluating unit of the laser receiver always as a reflected laser beam when the adjustment direction of the received beam and the rotational direction of the rotational platform are in the opposite direction.

The adjustment direction of the received beam for an uneven number of reflections of the rotating laser beam is likewise in the opposite direction to the known rotational direction of the rotational platform so that received beams that are created by an uneven number of reflections of the rotating laser beam are correctly categorized by the evaluating unit as a reflected laser beam.

With regard to the method according to the invention, the vertical laser plane that the rotating laser beam generates is adjusted with the help of the rotational platform. The evaluating unit of the laser receiver determines an adjustment direction of the vertical laser plane and compares the adjustment direction with the rotational direction of the rotational platform. Here it is important to note that the adjustment direction is dependent on the position of the laser receiver and the adjustment direction in opposing positions of the laser receiver is directed in opposite direction. The position of the laser receiver to the rotary laser can be determined with the help of the rotating laser beam.

In a first preferred further development of the method, the rotating laser beam generates a vertical laser plane limited to an angle $\varphi$ less than 360°. Here the limited vertical laser plane can be generated in a rotation mode or a scan mode of the rotary laser. In rotation mode, the laser beam is moved about the axis of rotation in a uniform rotational direction repeatedly by 360° and in scan mode the laser beam is moved in alternating rotational direction in a limited angle back and forth about the axis of rotation.

In a first variant of the method, the rotating laser beam is moved in a rotational direction by 360° about the axis of rotation, wherein the laser beam is switched on within the angle $\varphi$ and is switched off within the angle $\varphi$. The first variant is suitable for rotary lasers that have a rotation mode.

In a second alternative variant of the method, the rotating laser beam is moved back and forth within the angle $\varphi$ in alternating rotational direction about the axis of rotation. The second variant is suitable for rotary lasers that have a scan mode.

In a second preferred further development of the method, the rotating laser beam is moved in a rotational direction by 360° about the axis of rotation and the angle of 360° is subdivided into a first and second angle range wherein the rotating laser beam in the first and second angle range is distinguished in a beam property or in a plurality of beam properties. As part of the method according to the invention, the evaluating unit of the laser receiver analyzes the arriving received beam. Based on the beam property in which the rotating laser beam is distinguished in the first and second angle range, the evaluating unit can determine the angle range in which the detection field of the laser receiver has been hit by the received beam.

Preferably, the rotating laser beam is modulated with a modulation signal wherein in the first angle range a first modulation signal is used and in the second angle range a second modulation signal that is different from the first modulation signal is used. The first and second modulation signals can differ from one another in an amplitude, a form and/or a modulation frequency. As part of the method according to the invention, the evaluating unit of the laser receiver analyzes the arriving received beam and can determine the modulation signal with which the received beam was modulated. Based on the modulation signal, the evaluating unit can determine the angle range in which the detection field of the laser receiver was hit by the received beam.

According to the invention, to execute a method for comparing a received beam hitting a laser receiver with a rotating laser beam, a device is provided having a rotary laser that emits a rotating laser beam in a rotational direction about an axis of rotation and which is arranged on a rotational platform adjustable about an axis of rotation, and a laser receiver that has an evaluating unit and at least one detection field. The rotary laser is arranged in a vertical position on the adjustable rotational platform and the laser receiver is oriented in a transverse arrangement. The following applies to the components: the rotational axis of the rotary laser and the longitudinal direction of the detection field are oriented substantially perpendicular to the gravitational direction and the axis of rotation of the rotational platform and the transverse direction of the detection field are oriented substantially parallel to the gravitational direction, wherein the rotating laser beam generates a vertical laser plane that is arranged parallel to the gravitational direction.

Particularly preferably, the laser receiver has a tilt sensor that measures a tilt of the laser receiver relative to the gravitational direction of the gravitation field. The tilt sensor can be used to clearly define the orientation of the laser receiver. With regard to execution of the method according to the invention, the laser receiver is oriented in a transverse direction, wherein the transverse direction of the detection field should run in the transverse arrangement parallel and the longitudinal direction of the detection field should run in the transverse arrangement perpendicular to the gravitational direction. The transverse direction of the detection field and the gravitational direction can be in the same direction or in the opposite direction. With the help of the tilt sensor, the two orientations "same direction" and "opposite direction" can be distinguished from each other.

Particularly preferably, the rotational platform and the laser receiver can be connected communicatingly via a communication connection wherein the communication takes place between the evaluating unit of the laser receiver and a control unit of the rotational platform. With regard to executing the method according to the invention, the evaluating unit of the laser receiver determines an adjustment direction of the received beam relative to the laser receiver from the first and second height position and compares the adjustment direction of the received beam with the rotational direction of the rotational platform. The rotational direction of the rotational platform can be transmitted via the communication connection to the evaluating unit of the laser receiver, so that the method according to the invention can be carried out automatically.

Embodiments of the invention are described below by means of the drawings. This is not necessarily meant to represent the embodiments to scale, but rather the drawings, wherever useful for explanatory purposes, are executed in a schematic and/or slightly distorted form. It should be noted that various modifications and changes may be made concerning the form and detail of an embodiment without deviating from the general idea of the invention. The general idea of the invention is not limited to the exact form or the detail of the preferred embodiment shown and described below or limited to a subject matter that would be limited in comparison to the subject matter claimed in the claims. At given dimension ranges, values within the stated limits are to be disclosed as limit values and are arbitrarily usable and claimable. In the interest of simplicity, the same reference numbers are used below for identical or similar parts or parts with identical or similar function.

DETAILED DESCRIPTION OF THE DRAWINGS

Figure 1:
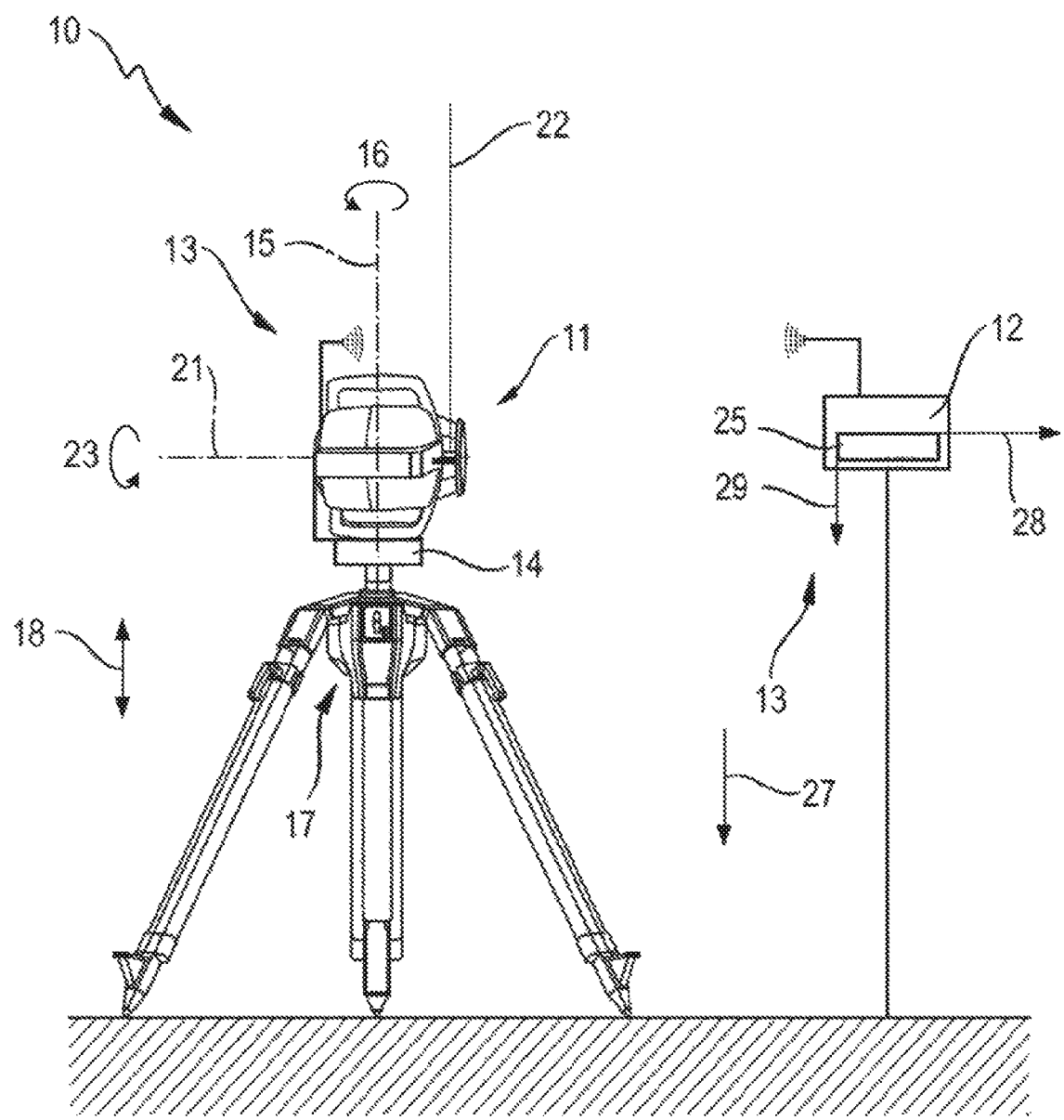
FIG. 1 illustrates a device with a rotary laser and a laser receiver.

FIG. 1 shows a device 10 with a rotary laser 11 and a laser receiver 12 which can be connected via a communication connection 13. The communication connection 13 is formed as a wireless communication connection or as a wired communication connection. The rotary laser 11 is oriented in a vertical position, which is provided for vertical applications of the rotary laser 11, and the laser receiver 12 is oriented in a transverse arrangement. The device 10 is provided for executing a method according to the invention for comparing a received beam hitting the laser receiver 12 with a rotating laser beam of the rotary laser 11.

The rotary laser 11 is arranged on a motorized rotational platform 14 which enables automatic angle adjustment of the rotary laser 11 about an axis of rotation 15 in a rotational direction 16. In addition, a height adjustment device 17 can be provided that enables automatic height adjustment of the rotary laser 11 in a height direction 18. The rotational platform 14 and the height adjustment device 17 can be formed as separate components that are connected to each other, or rotational platform 14 and height adjustment device 17 may be integrated in a tripod. The rotary laser 11 is formed as a horizontally and vertically usable rotary laser, which emits a rotating laser beam 22 about an axis of rotation 21 of the rotary laser 11. The rotating laser beam 22 rotates in a rotational direction 23 about the rotational axis 21 and generates a laser plane that is arranged perpendicular to the rotational axis 21.

The laser receiver 12 is equipped with a height measurement function that determines an impact position of a received beam 24 on a detection field 25 of the laser receiver 12 and represents the distance of the received beam 24 to a zero position 26 of the detection field 25 as a height position. The orientation of the laser receiver 12 is defined by means of the detection field 25 and a gravitational direction 27 of the gravitational field. The detection field 25 of the laser receiver 12 has a detection height in a longitudinal direction 28 and a detection width in a transverse direction 29. The longitudinal direction 28 corresponds to the measurement direction of the laser receiver 12 and the transverse direction 29 is oriented perpendicular to the longitudinal direction 25. The orientation of the laser receiver 12 is referred to as longitudinal arrangement in which the longitudinal direction 28 of the detection field 25 is oriented parallel, and the transverse direction 29 of the detection field 25 is oriented perpendicular to the gravitational direction 27, and the orientation of the laser receiver 12 is referred to as transverse arrangement in which the longitudinal direction 28 of the detection field 25 is oriented perpendicular, and the transverse direction 29 of the detection field 25 is oriented parallel to the acceleration direction 27.

Figure 2:
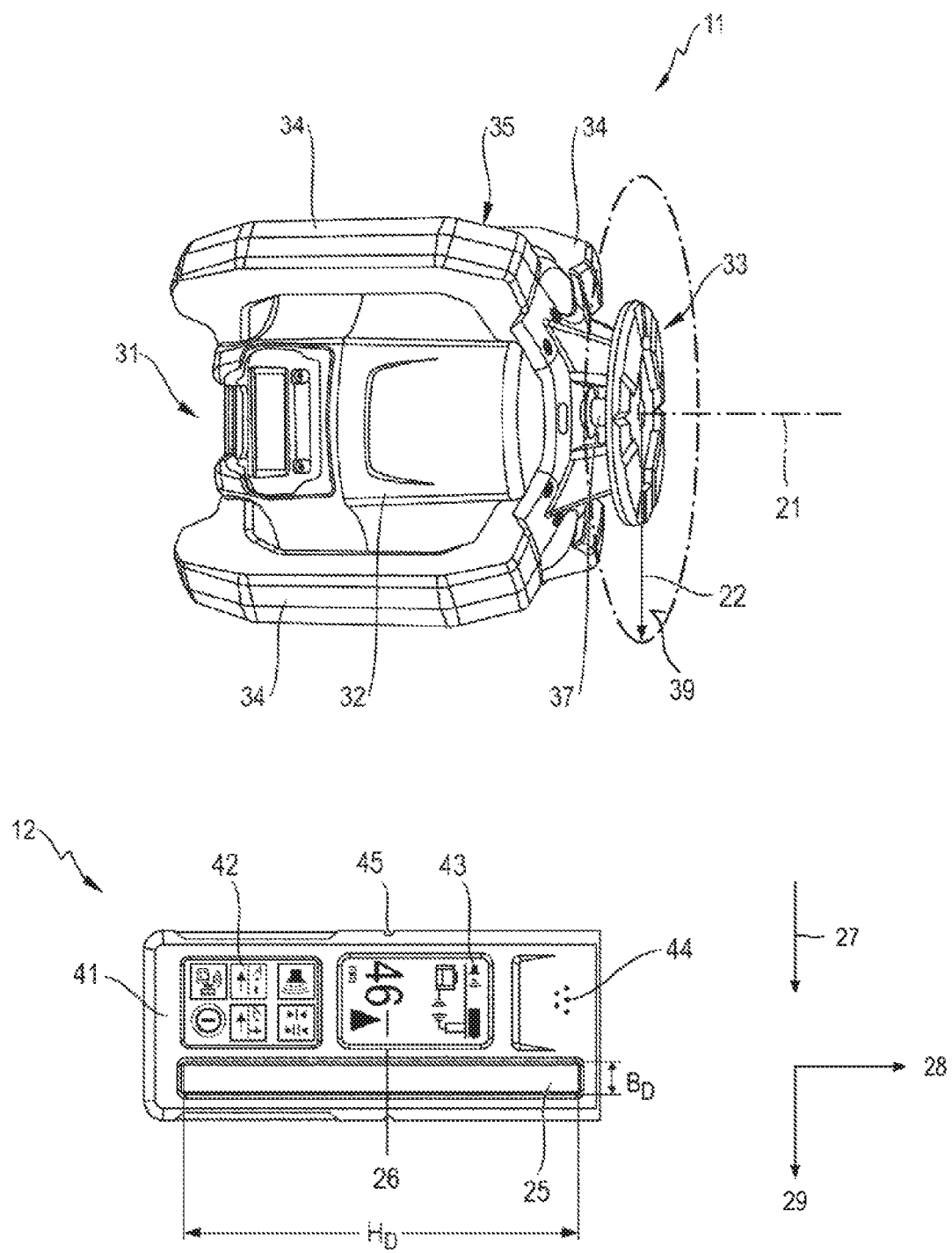
FIG. 2 illustrates the rotary laser and laser receiver of FIG. 1 in a three-dimensional representation wherein the rotary laser is oriented in the vertical position and the laser receiver is oriented in the transverse arrangement.

FIG. 2 shows the rotary laser 11 and the laser receiver 12 of FIG. 1 in a three-dimensional representation, wherein the rotary laser 11 and the laser receiver 12 for execution of the method according to the invention are oriented in a vertical position or in a transverse arrangement.

The rotary laser 11 comprises a device housing 31 and a measurement device arranged in the device housing 31. The device housing 31 consists of a base housing 32, a rotary head 33 and a plurality of handles 34. The rotary laser 11 is operated via an operating device 35 that is integrated into the base housing 32 and can be operated from the outside. In addition to the operating device 35 integrated into the base housing 32, a remote control 36 can be provided that can be connected to the rotary laser 11 via a communication connection. The measurement device of the rotary laser 11 generates inside the base housing 32 a laser beam that hits a diverting lens 37 rotating about the axis of rotation 18. The laser beam is diverted by the diverting lens 37 by 90° and forms the rotating laser beam 22 of the rotary laser 11, which spans a laser plane. The rotating laser beam 22 generates a vertical laser plane 39 in the vertical position of the rotary laser 11.

The laser receiver 12 comprises a receiver housing 41, an operating device 42, an optical display 43, a speaker 44, and the detection field 25. The detection field 25 has a detection height $H_D$ in the longitudinal direction 28 and a detection with $B_D$ in the transverse direction 29. The operating device 42, the optical display 43, the speaker 44, and the detection field 25 are integrated into the receiver housing 41 of the laser receiver 12. Via the optical display 43, the user can read information about the laser receiver 12. This includes, for instance, the charge state of the laser receiver 12, information about the communication connection 13 to a rotary laser 11, and the volume setting of the speaker 44. Additionally, the distance of the received beam 24 to the zero position 26 of the laser receiver 12 can be optically displayed as a numerical value. Alternatively or in addition to the optical display on the optical display 43, the distance of the received beam 24 can be communicated via the speaker 44. The zero position 26 of the detection field 25 is shown at the receiver housing 41 via marking notches 45.

Figure 3:
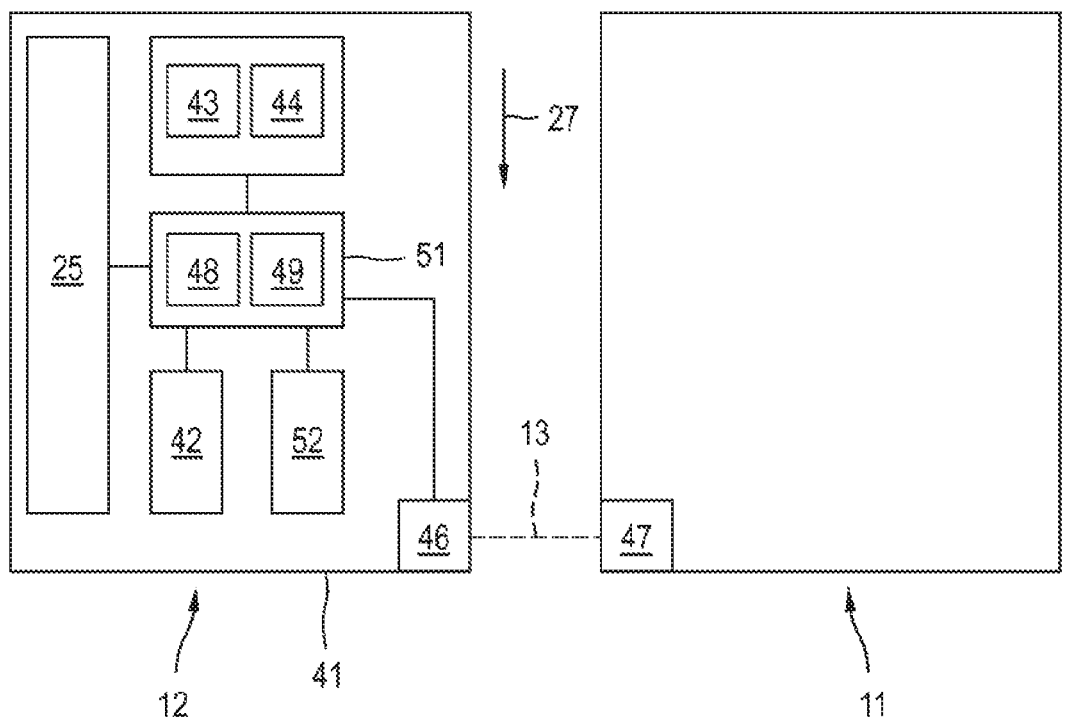
FIG. 3 illustrates the structure of the laser receiver and the interaction with the rotary laser in the form of a block diagram.

FIG. 3 shows the structure of the laser receiver 12 in detail and the interaction of the laser receiver 12 with the rotary laser 11 in the form of a block diagram. The communication between the laser receiver 12 and the rotary laser 11 can take place via the communication connection 13 which connects a first transmission and receiving unit 46 in the laser receiver 12 with a second transmitting and receiving unit 47 in the rotary laser 11. The first and second transmitting and receiving unit 46, 47 are formed, for example, as radio modules and the communication between the laser receiver 12 and the rotary laser 11 takes place via a communication connection 13 formed as a radio connection.

The detection field 25, the optical display 43, and the speaker 44 are connected to an evaluating unit 48 that is arranged inside the receiver housing 41. The evaluating unit 48 is connected to a control unit 49 to control the laser receiver 12, wherein the evaluating unit 48 and the control unit 49 are integrated into a control unit 51 formed, for instance, as a microcontroller. The laser receiver 12 can comprise additionally a tilt sensor 52 which is arranged inside the receiver housing 41 and which is connected to the control unit 41. With the assistance of the tilt sensor 52, a tilt of the laser receiver 12 can be measured relative to the gravitational direction 27 of the gravitational field. The tilt sensor 52 can comprise for instance a 2-axis acceleration sensor or two 1-axis acceleration sensors.

Figure 4:
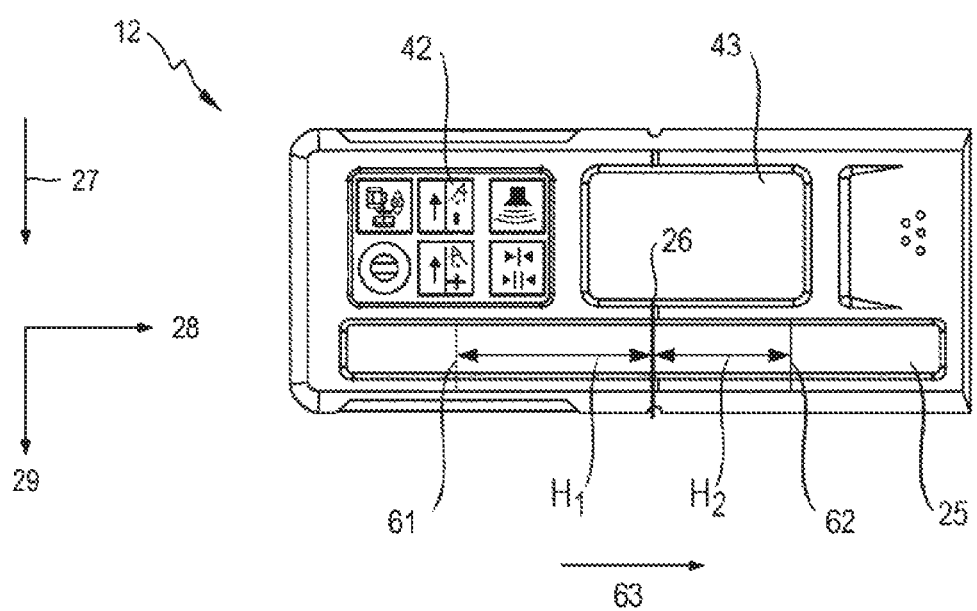
FIG. 4 illustrates the device of FIG. 1 with regard to executing a method according to the invention for comparing a received beam hitting the laser receiver with a rotating laser beam of the rotary laser.

FIG. 4 shows the device 10 with regard to executing the method according to the invention for comparing the received beam 24 with the rotating laser beam 22. The rotary laser 11 is arranged in a vertical position on the rotational platform 14 and the laser receiver 12 is oriented in a transverse arrangement. The following applies to the orientation of the components 11, 12, 14 of the device 10 to the gravitational direction 27: the rotational axis 21 of the rotary laser 11 and the longitudinal direction 28 of the detection field 25 are oriented perpendicular to the gravitational direction 27, the rotational axis 15 of the rotational platform 14 and the transverse direction 29 of the detection field 25 are oriented parallel to the gravitational direction 27. The rotating laser beam 22 generates the vertical laser plane 39, which is arranged parallel to the gravitational direction 27.

The rotary laser 11 is adjusted by the rotational platform 14 in the rotational direction 16 about the rotational axis 15 until the detection field 25 of the laser receiver 12 detects a received beam. Then the rotation of the rotary laser 11 about the rotational axis 15 is continued. During rotation of the rotary laser 11 about the rotary axis 15, the impact positions of the received beam on the detection field 25 are determined by the evaluating unit 48 at various times.

At a first time $t_1$, the evaluating unit 48 determines the impact position of the received beam on the detection field 25 as a first impact position 61 and stores the distance of the first impact position 61 to the zero position 26 of the detection field 25 as a first height position $H_1$. At a later second time $t_2$ the evaluating unit 48 determines the impact position of the received beam on the detection field 25 as a second impact position 62 and stores the distance of the second impact position 62 to the zero position 26 of the detection field 25 as a second height position $H_2$. The evaluating unit 48 determines an adjustment direction 63 of the received beam 24 relative to the laser receiver 12 from the first and second height position $H_1$, $H_2$.

Figure 5:
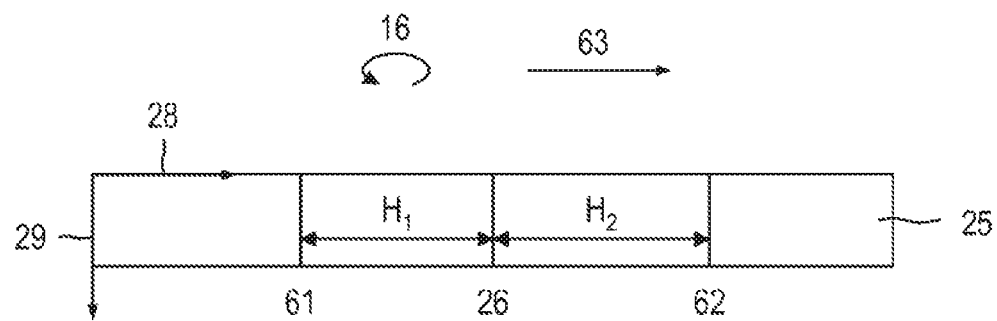
FIG. 5 illustrates a first and second impact position that the rotating laser beam of the rotary laser generates on a detection field of the laser receiver.

FIG. 5 shows the first and second impact position 61, 62, which the rotating laser beam 22 of the rotary laser 21 generates on the detection field 25 of the laser receiver 12. The first impact position 16 has a first distance $H_1$ to the zero position 26 of the detection field 25 and the second impact position 62 has a second distance $H_2$ to the zero position 26 of the detection field 25. The adjustment direction 63 of the received beam 24 runs parallel to the longitudinal direction 28 of the detection field 25.

The evaluating unit 48 of the laser receiver 12 determines the adjustment direction 63 of the received beam 24 relative to the laser receiver 12 from the first and second height position $H_1$, $H_2$ and compares the adjustment direction 63 of the received beam 24 with the rotational direction 16 of the rotational platform 14. The adjustment direction 63 of the received beam 24 and the rotational direction 16 of the rotational platform 14 are in the same direction and the received beam 24 is categorized by the evaluating unit 48 of the laser receiver 12 as a rotating laser beam 22.

Figure 6:
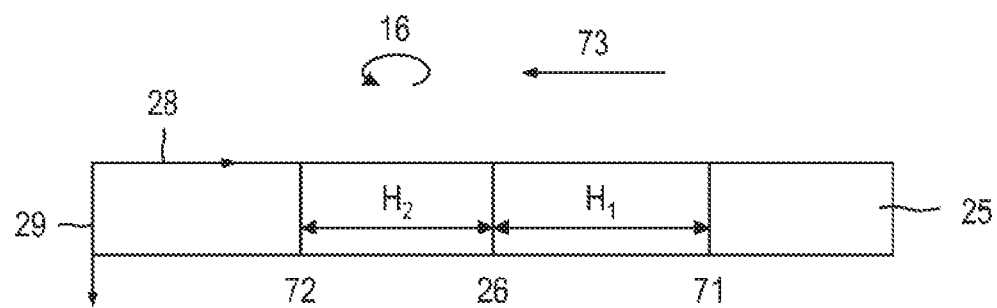
FIG. 6 illustrates a first and second impact position that the rotating laser beam of the rotary laser generates after a reflection on a reflection surface on the detection field of the laser receiver.

FIG. 6 shows a first and second impact position 71, 72, which the rotating laser beam 22 generates after a simple reflection on a reflection surface on the detection field 25 of the laser receiver 12. The first impact position 71 has a first distance to the zero position 26 of the detection field 25 and the second impact position 72 has a second distance to the zero position 26 of the detection field 25, wherein the first distance is referred to as first height position $H_1$ and the second distance as second height position $H_2$.

The evaluating unit 48 of the laser receiver 12 determines an adjustment direction 73 of the received beam 24 relative to the laser receiver 12 from the first and second height positions $H_1$, $H_2$ and compares the adjustment direction 73 of the received beam 24 with the rotational direction 16 of the rotational platform 14. The adjustment direction 73 of the received beam 24 and the rotational direction 16 of the rotational platform 14 are in the opposite direction, and the received beam 24 is categorized by the evaluating unit 48 of the laser receiver 12 as a reflected laser beam.

The adjustment direction of the received beam on the detection field 25 is reversed by a simple reflection of the rotating laser beam 22 on a reflection surface. This reversal of the adjustment direction is used to differentiate a rotating laser beam which has been reflected on a reflection surface from a rotating laser beam.

Figure 7:
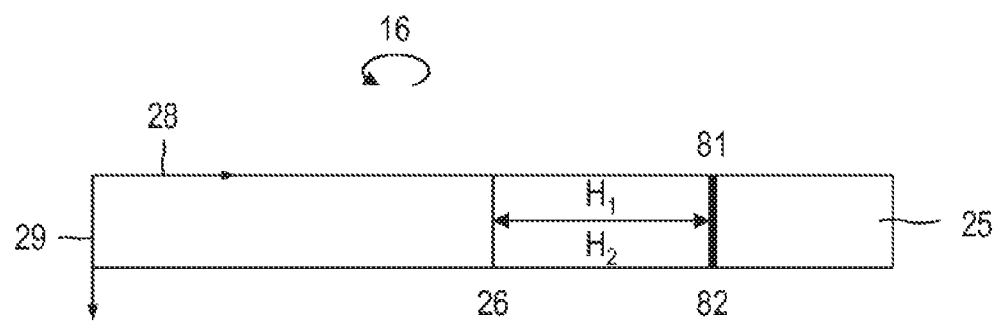
FIG. 7 illustrates a first and second impact position that generates a received beam formed as a non-rotating external beam on the detection field of the laser receiver.

FIG. 7 shows a first and second impact position 81, 82, which generates a received beam 24 formed as a non-rotating external beam on the detection field 25 of the laser receiver 12. The first impact position 81 has a first distance to the zero position 26 of the detection field 25, and the second impact position 82 has a second distance to the zero position 26 of the detection field 25, wherein the first distance is referred to as the first height position $H_1$ and the second distance as a second height position $H_2$.

The evaluating unit 48 of the laser receiver 12 determines the difference between the first and second height position $H_1$, $H_2$. The first impact position 81 substantially matches the second impact position 82 and the difference between the first and second height position $H_1$, $H_2$ yields zero. With a difference of zero, the evaluating unit 48 of the laser receiver 12 cannot determine an adjustment direction of the received beam 24 relative to the laser receiver 12. Because the received beam 24 is formed as a non-rotating external beam, the rotation of the rotary laser 11 about the rotational axis 15 does not have an impact on the impact position of the received beam 24 on the detection field 25.

For executing the method according to the invention, the rotary laser 11 is oriented in the vertical position and the laser receiver 12 is oriented in a transverse arrangement. The vertical laser plane 39, which the rotating laser beam 22 generates, is adjusted about the rotational axis 15 of the rotational platform 14 with the assistance of the rotational platform 14. The evaluating unit 48 of the laser receiver 12 determines an adjustment direction and compares the adjustment direction with the rotational direction 16 of the rotational platform 14. It is important to note that the adjustment direction is dependent on the position of the laser receiver 12 and the adjustment direction in opposing positions of the laser receiver 12 is directed opposite. The position of the laser receiver 12 to the rotary laser 11 can be determined with the help of the rotating laser beam 22.

The rotating laser beam generates a vertical laser plane limited to an angle φ less than 360°; angles less than 180° primarily are suitable as angle φ. The rotary laser 11 starts its rotation about the rotational axis 21 in a rotational angle which is referred to as zero angle. Proceeding from the zero angle, a positive angle range can be defined between 0° and +180° and a negative angle range can be defined between 0° and −180°.

Alternatively, the rotating laser beam is moved in a rotational direction by 360° about the rotational axis 21 and the angle of 360° is subdivided into a first and second angle range, for instance the positive angle range between 0° and +180° can be defined as a first angle range and the negative angle range between 0° and −180° can be defined as a second angle range. To differentiate the first and second angle range, the rotating laser beam in the first and second angle range has at least one different beam property. On the basis of the beam property in which the rotating laser beam 22 differs in the first and second angle range, the evaluating unit 48 of the laser receiver 12 can determine the angle range in which the detection field 25 of the laser receiver 12 has been hit by the received beam 24.

A modulation signal, for instance, is suitable as a beam property that can be used to differentiate the first and second angle range. In the first angle range a first modulation signal is used and in the second angle range a second modulation signal that is different from the first modulation signal is used. The first and second modulation signal can differ from each other in an amplitude, a form and/or a modulation frequency. As part of the method according to the invention, the evaluating unit 48 of the laser receiver 12 analyzes the arriving received beam 24 and can determine the modulation signal with which the received beam 24 has been modulated. By means of the modulation signal, the evaluating unit 48 can determine the angle range in which the detection field 25 of the laser receiver 12 has been hit by the received signal 24.

The invention claimed is:

1. A method for comparing a received beam hitting a laser receiver with a rotating laser beam which is moved about a rotational axis by a rotary laser, wherein the laser receiver includes an evaluating unit and a detection field having a longitudinal direction and a transverse direction, comprising the steps of:
    disposing the rotary laser on a rotational platform that is adjustable about a rotational axis, wherein the rotational axis of the rotational platform is oriented parallel to a gravitational direction of the gravitational field and wherein the rotational axis of the rotary laser is oriented perpendicular to the rotational axis of the rotational platform; and
    orienting the laser receiver in a transverse arrangement wherein in the transverse arrangement the longitudinal direction of the detection field is oriented perpendicular to the gravitational direction and the transverse direction of the detection field is oriented parallel to the gravitational direction;
    adjusting the rotary laser on the rotational platform in a rotational direction about the rotational axis of the rotational platform at least until the received beam hits the detection field of the laser receiver;
    determining, in the longitudinal direction of the detection field, an adjustment direction of the received beam relative to the laser receiver by the evaluating unit; and
    comparing the adjustment direction of the received beam by the evaluating unit with the rotational direction of the rotational platform.

2. The method as claimed in claim 1 further comprising the step of storing a first impact position of the received beam on the detection field at a first time as a first height position and a second impact position at a second time as a second height position by the evaluating unit, wherein the second time is later than the first time, wherein the adjustment direction of the received beam is determined by the evaluating unit from the first height position and the second height position.

3. The method as claimed in claim 2 further comprising the step of categorizing the received beam by the evaluating unit as an external beam if the first height position and the second height position of the received beam substantially match.

4. The method as claimed in claim 2, wherein the adjustment direction of the received beam is determined by the evaluating unit if the first height position and the second height position of the received beam are different.

5. The method as claimed in claim 4 further comprising the step of categorizing the received beam by the evaluating unit as a rotating laser beam if the adjustment direction of the received beam and the rotational direction of the rotational platform are in a same direction.

6. The method as claimed in claim 5 further comprising the step of switching the laser receiver by the evaluating unit to a measurement mode wherein a position of the received beam is determined in the measurement mode.

7. The method as claimed in claim 4 further comprising the step of categorizing the received beam by the evaluating unit as a reflected laser beam if the adjustment direction of the received beam and the rotational direction of the rotational platform are in opposite directions.

8. The method as claimed in claim 1, wherein the rotating laser beam generates a vertical laser plane limited to an angle less than 360°.

9. The method as claimed in claim 8, wherein the rotating laser beam is moved in a rotational direction by 360° about the rotational axis of the rotating laser beam and wherein the rotating laser beam is switched on within the angle and is switched off outside the angle.

10. The method as claimed in claim 8, wherein the rotating laser beam is moved back and forth within the angle in an alternating rotational direction about the rotational axis of the rotating laser beam.

11. The method as claimed in claim 1, wherein the rotating laser beam is moved in a rotational direction by an angle of 360° about the rotational axis of the rotating laser beam, wherein the angle of 360° is subdivided into a first angle range and a second angle range, and wherein the rotating laser beam in the first angle range and the second angle range is distinguished in a beam property or in a plurality of beam properties.

12. The method as claimed in claim 11 further comprising the step of modulating the rotating laser beam with a modulation signal wherein a first modulation signal is used in the first angle range and a second modulation signal which is different from the first modulation signal is used in the second angle range.

13. A device, comprising:
a rotary laser, wherein the rotary laser emits a laser beam rotating in a rotational direction about a first rotational axis and wherein the rotary laser is disposed on a rotational platform and is adjustable about a second rotational axis; and
a laser receiver which has an evaluating unit and a detection field, wherein the laser receiver performs the method according to claim 1.

14. The device as claimed in claim 13, wherein the laser receiver has a tilt sensor that measures a tilt of the laser receiver relative to a gravitational direction.

15. The device as claimed in claim 13, wherein the rotational platform and the laser receiver are communicatively connectable via a communication connection and wherein a communication takes place via the communication connection between the evaluating unit of the laser receiver and a control unit of the rotational platform.

* * * * *